United States Patent
Spinella-Mamo

(10) Patent No.: US 11,032,337 B2
(45) Date of Patent: Jun. 8, 2021

(54) CONTEXTUAL AND COLLABORATIVE MEDIA

(71) Applicant: Vincent Paul Spinella-Mamo, Boca Raton, FL (US)

(72) Inventor: Vincent Paul Spinella-Mamo, Boca Raton, FL (US)

(*) Notice: Subject to any disclaimer, the term of this patent is extended or adjusted under 35 U.S.C. 154(b) by 289 days.

(21) Appl. No.: 16/159,689

(22) Filed: Oct. 14, 2018

(65) Prior Publication Data

US 2019/0116212 A1    Apr. 18, 2019

Related U.S. Application Data

(60) Provisional application No. 62/572,564, filed on Oct. 16, 2017.

(51) Int. Cl.
| | |
|---|---|
| *H04L 29/06* | (2006.01) |
| *G06F 16/44* | (2019.01) |
| *G06F 16/48* | (2019.01) |
| *G06F 40/166* | (2020.01) |
| *G06F 40/194* | (2020.01) |
| *G06F 40/197* | (2020.01) |

(52) U.S. Cl.
CPC .......... *H04L 65/4023* (2013.01); *G06F 16/44* (2019.01); *G06F 16/489* (2019.01); *G06F 40/166* (2020.01); *G06F 40/194* (2020.01); *G06F 40/197* (2020.01)

(58) Field of Classification Search
CPC . H04L 65/4023; G06F 40/166; G06F 40/194; G06F 40/197; G06F 16/44; G06F 16/489

USPC ........................................................ 707/608
See application file for complete search history.

(56) References Cited

U.S. PATENT DOCUMENTS

| | | | | |
|---|---|---|---|---|
| 2006/0265398 | A1* | 11/2006 | Kaufman | ................. G06F 16/93 |
| 2010/0278453 | A1* | 11/2010 | King | ..................... G06F 40/169 382/321 |
| 2012/0089565 | A1* | 4/2012 | Jackson | ............... G06Q 10/103 707/608 |
| 2012/0102114 | A1* | 4/2012 | Dunn | ..................... G06Q 50/01 709/204 |
| 2012/0189273 | A1* | 7/2012 | Folgner | .............. H04N 21/2187 386/241 |
| 2013/0185643 | A1* | 7/2013 | Greifeneder | ............ H04L 67/22 715/736 |
| 2013/0290053 | A1* | 10/2013 | Zumwalt | ................ G06Q 10/06 705/7.15 |

(Continued)

*Primary Examiner* — Hicham Skhoun

(57) ABSTRACT

A system and method for providing context to collaborative media. Such a system may comprise associating timestamps with media as entered by one or more users. When a user types, or otherwise inputs media (text, images, video, audio, files, etc.), such media may be associated with a project, as well as provided an associated timestamp. Such associations between media and timestamps may be stored in a database. When such media comprises text, various aspects of the system may provide for associating each character with a timestamp. When one or more users views the project, an application may cause all media to be displayed to the viewing user. The viewing user may click, highlight, or otherwise select any of the media such that only media relevant to the selected media (e.g. captured within 1 s, 2 s, 5 s, etc.) is displayed in a related media panel.

17 Claims, 8 Drawing Sheets

(56) References Cited

U.S. PATENT DOCUMENTS

| | | | |
|---|---|---|---|
| 2014/0019187 A1* | 1/2014 | Olsen | G06Q 10/06313 705/7.23 |
| 2014/0023348 A1* | 1/2014 | O'Kelly | G11B 27/031 386/278 |
| 2014/0169767 A1* | 6/2014 | Goldberg | G11B 27/031 386/282 |
| 2015/0242104 A1* | 8/2015 | Stokman | G11B 27/031 715/723 |
| 2016/0004679 A1* | 1/2016 | Grimm | G06F 3/0484 715/719 |
| 2016/0026720 A1* | 1/2016 | Lehrer | G06F 16/23 707/710 |
| 2016/0063840 A1* | 3/2016 | Kumarasamy Mani | H04L 67/22 340/540 |
| 2016/0099856 A1* | 4/2016 | Ramaswamy | G06Q 30/02 707/748 |
| 2016/0148187 A1* | 5/2016 | Trickel | G06Q 10/06313 705/40 |
| 2016/0321612 A1* | 11/2016 | Nakazawa | H04L 67/1097 |
| 2017/0185574 A1* | 6/2017 | Fern | G06Q 10/103 |
| 2017/0221253 A1* | 8/2017 | Banerjee | G06T 11/001 |
| 2018/0039253 A1* | 2/2018 | Jacobs, II | G06F 30/00 |
| 2018/0189733 A1* | 7/2018 | Newhouse | G06Q 10/06 |
| 2018/0196880 A1* | 7/2018 | Carter | G06F 16/9537 |

\* cited by examiner

CONTEXTUAL AND COLLABORATIVE MEDIA

CROSS-REFERENCE TO RELATED APPLICATIONS

This application claims the benefit of the filing date under 35 USC 119(e) of the provisional application entitled "Contextual and Collaborative Media" Ser. No. 62/572,564, filed on Oct. 16, 2017, the entire contents of which is fully incorporated herein by reference.

BACKGROUND OF THE INVENTION

Note taking is generally performed during meetings, lectures, and various other circumstances. On occasion, notes may be supplemented by other media. However, media captured (especially media captured by third parties) may lack context, rendering their purpose of aiding recollection ineffective.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
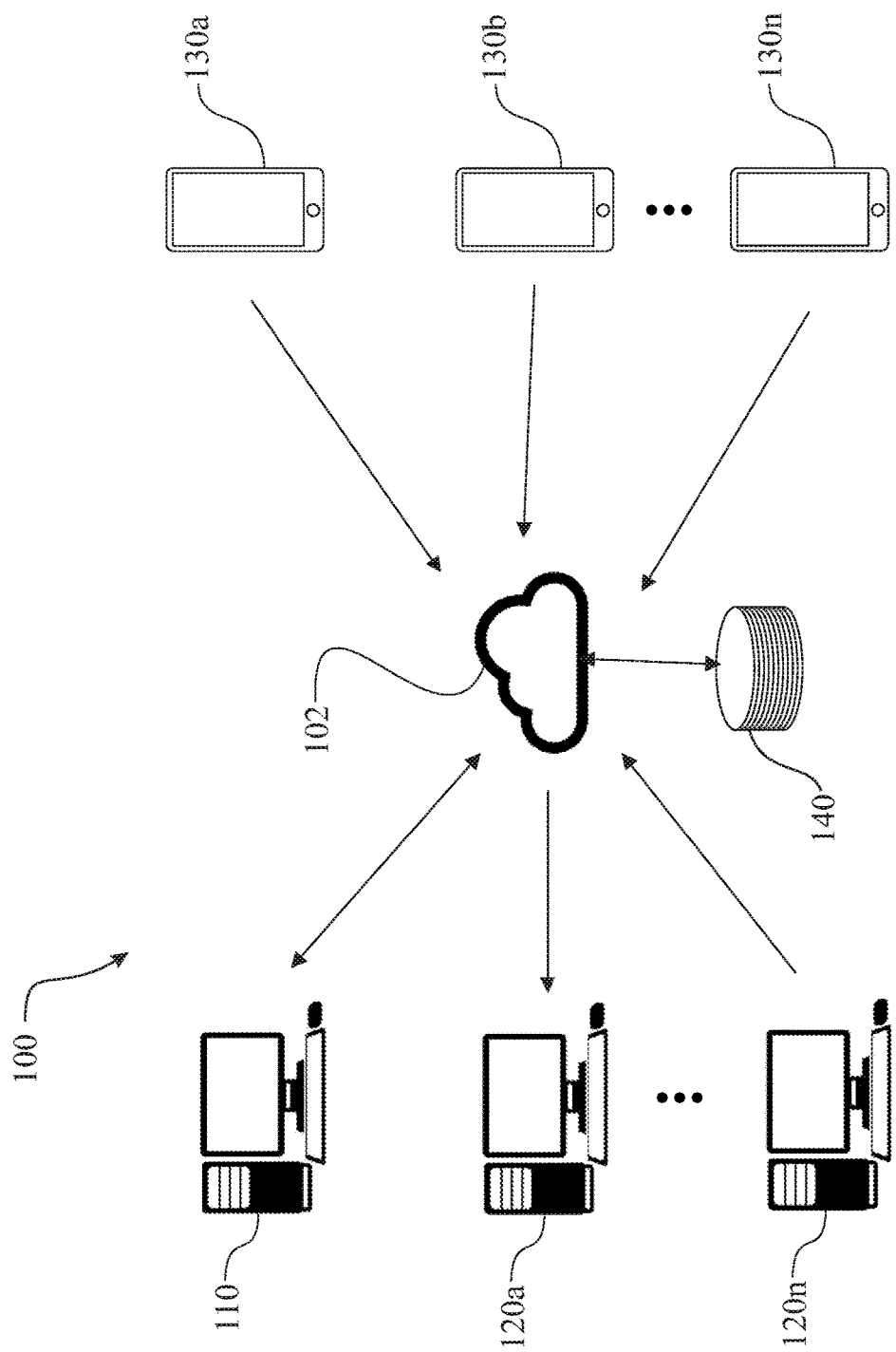
FIG. 1 presents a system to create and present collaborative and contextual media.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding background or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As above, supplementing note taking with media is used to aid in recollection of the subject for which the notes are taken. However, without context (especially when the media is contributed by third parties), the media may be ineffective at aiding recollection to the content of the written notes. Furthermore, such the lack of context may add confusion to a third-party viewer of the notes and media. Described in detail below is a system which provides context for note taking which is supplemented by media, including media from third parties (i.e. collaborative media).

In one example, a system for providing context to collaborative media may allow a user using a computing system to create a project. A user creating the project may be referred to as a main user. The main user may create such a project via an application on a computing system or on a mobile computing device (e.g. a smartphone, PDA, tablet, etc.). In some examples, such an application may be viewed on a website via a browser having an associated cloud based server (e.g. one or more computing systems remote from the main user). Once a project is created, the main user may begin taking notes in a text area of the application. As the main user types, the application may continually send the contents of the text area (which may include relevant hypertext markup language) to the cloud based server using. In those examples where the application is displayed via a web browser, such transmissions may be performed by POST or GET requests via AJAX, JavaScript, or the like, such that the cloud based server may perform operations on the contents asynchronously. In some examples, the application may only send the text in the text area to the cloud based server whenever the main user types a key, when the text in the text area differs from the previously entered text, and/or with a specific frequency (e.g. every 1 s, 2 s, 5 s, etc.). By limiting the number of times text is sent, (e.g. only when there is a difference and 2 s has elapsed), processing requirements of the cloud based server may be reduced.

The cloud based server may receive the text (e.g. as a string, file, etc.) and compare it with a previous version (i.e. the old text) accessible to the cloud based server on a character by character basis (e.g. by performing a difference operation). Such a cloud based server may also have a database storing an association between the characters of text and timestamps of each character. In at least some examples, timestamp associations with characters may be stored as comma separated values of timestamps corresponding to each successive character of text, though any other association is contemplated. In those examples where a character is inserted, the cloud based server may associate the new character with a current timestamp on the cloud based server (e.g. by inserting the current time stamp into the comma separated values, storing the character in a database associating the character with a time and/or position in the text, etc.). In those examples where a character is deleted, the cloud based server may remove the previously associated timestamp (e.g. by removing the timestamp from the comma separated values, from the database, etc.). In those examples where the character exists in both the text and old text, the old timestamp associated with the character may be left unchanged. The text and associated timestamps may then be updated in the database (or otherwise made accessible to the cloud based server) to reflect the latest values. As such, every character the main user types may be associated with a timestamp.

Additionally, or alternatively, the main user may be provided with various other media inputs. As non-limiting examples, the main user may be presented with an option to record a video, capture an image, or record audio based on various input devices (e.g. a camera, a microphone, etc.) associated with, or otherwise accessible to, the computing device of the main user, in addition to uploading files (which may include media files accessible via the internet), etc. Upon starting a recording (video and/or audio), capturing an image, or playing a media file, the application may transmit at least a portion of data to the cloud based sever for storage. Additionally, or alternatively, the cloud based server may associate the transmitted media with a timestamp. Such a timestamp may be indicative of a start of recording (video and/or audio), an image capture event, or other event (e.g., start of media file playback, browsing the internet in a browser, or otherwise interacting with one of the devices). In at least some examples, associations between media (characters, video, audio, images, files, etc.) and timestamps may be stored in a database accessible by the cloud based server.

A main user may invite additional users to the project by creating a "share," thereby creating share users. The main user may set attributes of such shares as being contribute and/or view. Such shares may be stored in a database accessible by the cloud based server. Share users given the contribute attribute may add media to a project. Such media (text, video, images, audio, files, etc.) may be contributed in the same way as the main user, such that every character, video, image, audio, etc. provided by the share user has an associated timestamp an is stored in the database. Importantly, in those examples where the cloud based server is representative of multiple computing systems, timestamps may be provided by one or more computing system of the multiple computing systems (e.g. via an Application Programming Interface). Additionally, or alternatively, each computing system of the multiple computing systems may be synchronized so as to provide the same current timestamp. Share users who are only given the view attribute (i.e. they do not have the contribute attribute) may be restricted from contributing to a project, but may view a project, as will be described in detail below. In at least some examples, share users who have the contribute attribute may create additional shares and designate those shares as contribute and/or view. Additionally, or alternatively, those share users who only have a view attribute may create shares, but may only provide a view attribute to those shares. In other examples, only the main user may create shares. In some examples, a permission may be set on the user to allow the user to create additional shares, as well as to indicate whether the additional shares have the contribute and/or view attribute set.

Share users (i.e. users who have been invited to contribute and/or view the project) may access the project via a computing system (e.g. laptop, desktop, etc.) via a window provided in an application, such as a website in a web browser. Additionally, or alternatively, such share users may access such projects via a mobile computing device, such as a smartphone, tablet, mobile phone, PDA, or the like.

All users who have access to view a project (i.e. all main users and share users having the view attribute) may be presented with all media associated with the project, including all text, videos, images, audio, files, etc. Upon clicking, highlighting, or otherwise selecting a portion of any media, the application may query the cloud based server for all time related media. The cloud based server may then cause the application to display all media having a timestamp (or, in the case of video and audio recordings, a portion of the media) at or about (e.g. within 1 s, 2 s, 5 s, etc.) of the selected media in a related media panel of the application, or otherwise highlight the relevant media (e.g., text). As a non-limiting example, when a viewing user highlights a portion of text displayed, the application may send the substring and/or a first character position and last character position of the selected text to the cloud based server. The cloud based server may then query the database for all media having timestamps between at or about (e.g. within 1 s, 2 s, 5 s, etc.) a smallest and greatest timestamp associated with the selected characters. As a non-limiting example, the cloud based server may return a subset of images, a subset of videos with respective time offsets, and audio with respective time offsets, such that the media corresponds to the selected text. Time offsets for video and audio media are selected such that, when displayed to a viewing user, the video or audio recording starting position is aligned at or about (e.g. within 1 s, 2 s, 5 s, etc.) of the earliest timestamp of the selected media. In those examples where multiple text based media are created, the cloud based server may additionally, or alternatively, return the relevant characters, words, or sentences having characters with timestamps at or about (e.g. within 1 s, 2 s, 5 s, etc.) of the selected text. Similarly, clicking on an image may return all media, including relevant text, at or about the timestamp of the image. In such a way, the viewing user may be provided context for the media.

In at least some examples, the user viewing the project may also choose to have additional context about text based media displayed, such as by associating a highlighting color with the text based media. In such examples, upon receiving a request to colorize the text based media, the application may provide highlighting of the characters in the text area. Since timestamps of each character is known, a difference between the first and last (i.e. earliest and latest) timestamps of the text may be determined. The timestamps may then be mapped to one or more color palettes such that each timestamp between the first and last timestamp corresponds to an RGB value. The RGB values may be determined in a way so as to provide the viewing user more context. As one non-limiting example, such highlighting may correspond to brighter green associated with characters at or near the earliest timestamp, fading into no highlighting for characters halfway between the earliest and latest timestamp, and darkening into a bright red as the characters approach the latest timestamp, though any other color mapping is contemplated. By highlighting the characters with colors indicative of timestamps, a viewing user may easily glean when the characters were typed relative to other characters.

Using such a system may provide users additional context when reviewing notes. Details of such a system are presented with respect to the figures below.

The System

FIG. 1 shows an example system 100 for creating and displaying collaborative and contextual media. As shown, a cloud based server 102 (which may comprise one or more computing systems, whether local to each other or distributed) is able to receive requests from various computing systems 110, 120a-n, as well as any number of mobile devices 130a-n. In at least one example, a user (not pictured) using computing system 110 may create a project via a request at the cloud based server 102, though the request may be originated from any other device. Such a cloud based server 102, may create a new project in a database 140, as well as associate the user with the database 140. Such a user may be referred to as a main user (i.e. a user that creates a project).

The main user (e.g. the user operating computing system 110) may invite other users to contribute to and/or view the project by creating shares. A share may be stored in database 140 and associate a project with a user and a contribute and/or view attribute. Those shares having a contribute attribute may contribute additional media to the project. Those shares having a view attribute may view media associated with a project. In some examples, a share is created for the main user, with both the contribute and view attributes.

As illustrated further in FIG. 1, computing system 110 may have both a contribute and view attribute, as indicated by the double arrowed line. In such a configuration, the user of computing system 110 may both add media to the project, as well as view media associated with the project. As a further example, the user of computing system 120*a* may only have view attribute (i.e. a share having only the view attribute associates the user of computing system 120*a* with the project), allowing that user to view all media associated with the project, but not contribute. As further illustrated, all other users (i.e. users of computing systems 120*n* and mobile devices 130*a-n*) have been assigned a contribute attribute, but not a view attribute (i.e. by associated shares with respective attributes set). Those users may be able to send media to cloud based server 102, but would not be able to view the media associated with the project.

In any of the above examples, when a user contributes media such media may be associated with a timestamp, such associations stored in database 140 accessible by the cloud based server 102. Such media may include, for example, text, audio, video, or images, though any other form of media is contemplated (e.g. files uploaded, links shared, actions performed, etc.). As will be described in detail below, when viewing a project, a user may select portions of any media (e.g. by highlighting text, clicking on an image, selecting a playback position in a media file, or otherwise selecting the media). Once media has been selected, all other media within a time period of the selected media (or playback position thereof) may be displayed to the user viewing the project.

Though illustrated as a single cloud based server 102, it should be noted that cloud based server 102 may be any number of computing systems, which may be local or distributed. In those examples were the cloud based server corresponds to multiple computing systems, a single computing system may be used to provide timestamps and/or each of the multiple computing systems may be synchronized.

User Contribution Interface

Figure 2:
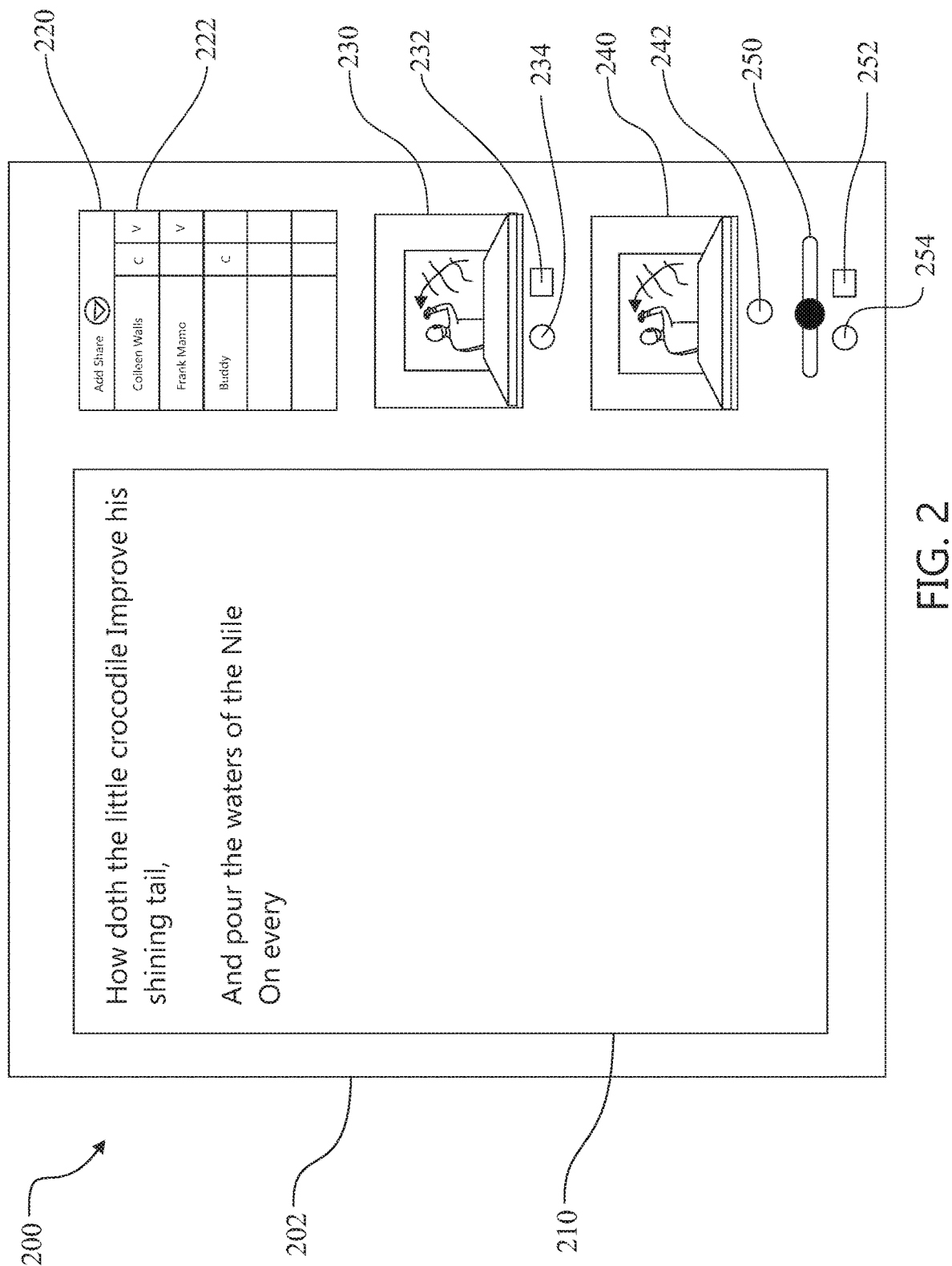
FIG. 2 presents a user interface for adding media to a project.

FIG. 2 illustrates an example user interface 200 for contributing media to a project. The user interface of FIG. 2 may, for example, be the contribution interface the user of computing system 110 views when creating and contributing to a project. Such a user interface 200 may be, for example, displayed inside a window 202 (e.g. a window in a browser of a computer, an application window, etc.). The window 202 may have a text panel 210 for a user to enter text. Additionally, the user may enter add other media. As non-limiting examples, a user may add video 230 from a video device associated with or otherwise accessible by (whether locally, remotely, wireless, or wired) the computing system by pressing a video record button 234 and a video stop button 232, add images 240 from an image device associated with or accessible by (whether locally, remotely, wireless, or wired) with the computing system by pressing a capture button 242, and add audio 250 from an audio device associated with or accessible by (whether locally, remotely, wireless, or wired) the computing system by pressing an audio record button 254 and an audio stop button 252. As non-limiting examples, such devices may include, but are not limited to, web cameras, USB cameras, wireless cameras accessible to the computing system, video streamed over an internet connection (which may include media from remote servers, such as web videos), etc. In some examples, whenever the user presses any of the video record button 234, the capture button 242, or the audio record button 254, the computing system transmits at least a portion the media to a cloud based server (e.g. cloud based server 102) for storage. In addition to storing the media at the cloud based server, the cloud based server may also associate a timestamp with the media. Such a relationship between the project, media, and timestamp may be stored by the cloud based server in a media database, such as media database 140.

In those examples where the user is contributing text media (e.g. from text panel 210), the application may monitor contents of text panel 210 to determine whether or not to send the contents to the cloud based server. As non-limiting examples, the application may determine that a change has occurred (i.e. the text in text panel 210 has changed), a time has elapsed (e.g. 1 s, 2 s, 5 s, etc.), or some combination thereof. For instance, it may reduce compute time to only send text of text panel 210 to the cloud based server if at least 5*s* has elapsed since the last transmission and a change in the text is detected. Such monitoring may be done, for example, using JavaScript in a web browser. In some examples, transmission of the text may include any hypertext markup (to indicate, for example, bolding, italics, etc.) and may be sent asynchronously so as not to interfere with a user's experience. In at least some examples, only a diff (difference) of the text since the last transmission may be sent. In such examples, the cloud based server may retrieve (e.g. from a file store or from the database) a previously stored version of the text, as well as associations of each character in the previous text timestamp. In some examples, the timestamps may be stored as a series of comma separated values, such that each value represents a timestamp of successive characters, though any other association of characters and timestamps is contemplated. The cloud based server may then compare each character of the newly transmitted text with the previous text, or otherwise use the diff having associated character positions. Where an addition occurs, the cloud based server may associate the current timestamp with the additional character (e.g. by associating the value of the current timestamp with the character). Where a deletion occurs, the cloud based server may remove the associated timestamp (e.g. by deleting the value). The newly transmitted text, as well as the updated associated timestamps, may be stored on, or otherwise accessible by, the cloud based server and/or the database.

In at least some examples, a user may add additional users to a project and set attributes for the additional users. In some examples, only the user who creates the project may add additional users and set attributes for the additional users (i.e. contribute and/or view). In some examples, users may add additional users having similar share attributes (e.g. a user having a share with only the view attribute may not create a contribute user, etc.). Such additions of users, or a "share" is illustrated in FIG. 2 as share panel 220. Share panel 220 may provide a list 222 of users which have either a contribute and/or view attribute set. As illustrated in FIG. 2, those users having a "c" or contribute attribute set (i.e. enabled or set to true) may add media to the project. Those users having a "v" or view attribute set (i.e. enabled or set to true) may view the project, with all accompanying media. As illustrated in FIG. 2, the main user may have created the user "Colleen Walls" having both a contribute and view attribute set (meaning Colleen Walls can both contribute media to the project and view the media added to the project), created the user "Frank Mamo" having only the view attribute (meaning that Frank Mamo may not be able to add media to the project, but can view the project when closed), and created the user "Buddy" with the contribute attribute only (meaning Buddy can only contribute to a project, but cannot view any of the media contributed (which may include the media he contributes)). Additionally, or alternatively, the main user may selectively choose which users (whether having a "c" or "v" attribute) as being able to create additional users (permissions) and the attributes and permissions those users may have.

Once a user (which may be a main user and/or any user having a "c" attribute or otherwise having permission) decides to close the project, the project may be closed indicating that no additional media may be added to the project (i.e. the project is complete). Until such time, the project may be referred to as being open. In at least some examples, all users having a "c" attribute may all have to close the project to stop adding media. In such cases, any user may be able to contribute additional media (even after "closing" the project) and close the project again. In other examples, the project may be closed when the main user closes the project. In still other examples, the project may be closed when any one user closes the project.

Mobile/Smart Device Interaction

Figure 3:
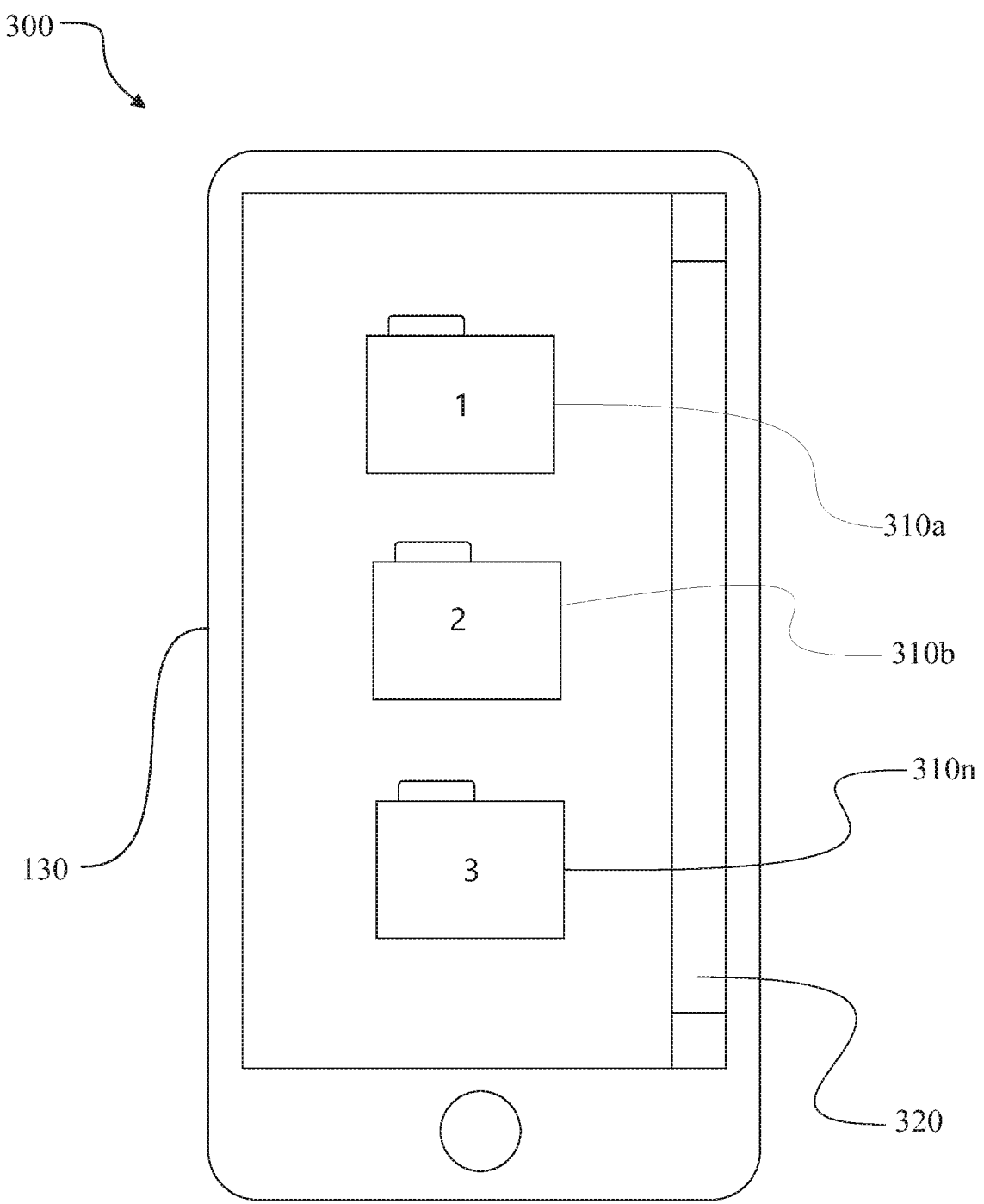
FIG. 3 presents a user interface for a mobile device for selecting projects.

FIG. 3 illustrates a mobile device interface 300. In some examples, when a share is created, a share user may receive an indication (e.g. via email or some other alert) that a new project is either viewable or open for contribution. In some examples, a share user may contribute to and/or view a project through that share user's mobile device (e.g. a smartphone, tablet, mobile computing device, etc.). In those examples where the share user may be contributing to and/or viewing multiple projects, mobile device 130, may display all projects shared with the share user for the share user to select. As illustrated in the example of FIG. 3, the mobile device interface 300 may display projects 310a through 310n to the share user. Each of the projects may be sorted by name, contribute/view attribute, or otherwise displayed to the share user. In fact, in some examples, there may be so many projects shared with the share user that a scroll 320 is present to allow the user and/or the user is able to search for a particular project. Upon selecting any project, a contribute or view application window will open, depending on whether the project is open or complete and whether the share user's share has the view and/or contribute attribute set.

Though not illustrated in FIG. 3, the mobile device interface 300 may also provide an indication whether the share created for each project has a contribute attribute and/or a view attribute. In some examples (also not illustrated), the mobile device interface 300 may allow the share user to create additional projects and/or create a share to other users (i.e. adding additional users to a project and setting contribute and/or share attributes).

It should be noted that while the illustration is depicted with reference to a smartphone or mobile device, similar presentations may be made to any other user using any other computing device, such as any of computing systems 110, 120a-n. Furthermore, in some examples, a search interface may be provided in any of the examples to allow the share user to search for a specific project. In such examples, only projects having a project name or some media containing the search phrase (e.g. text in written media, audio, meta tags, filenames, etc.) may be displayed for selection.

Mobile Phone Contribute

Figure 4:
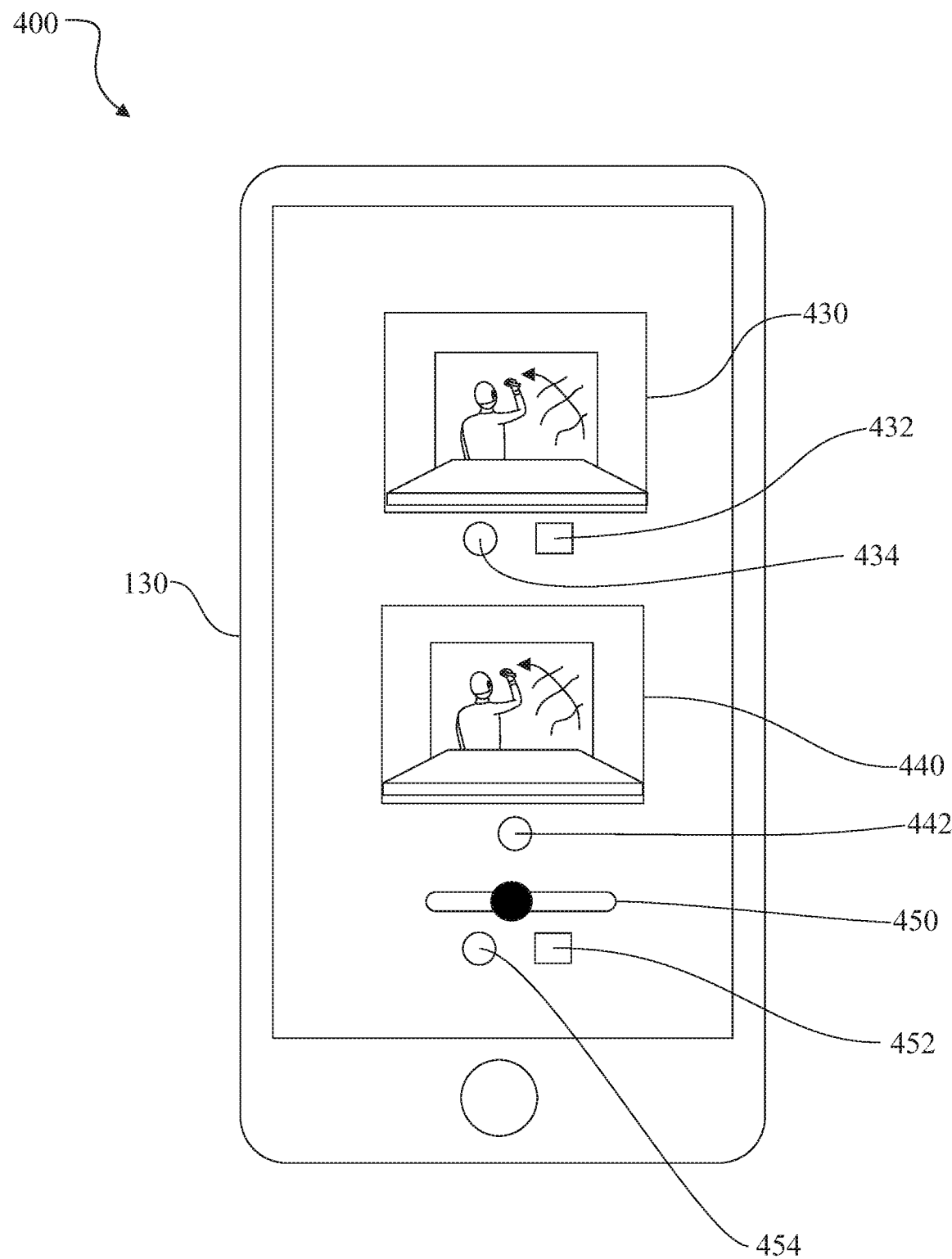
FIG. 4 illustrates a user interface for a mobile device to add collaborative media to a project.

FIG. 4 illustrates a mobile user input interface 400. Such a mobile user input interface 400 may be displayed to a share user on a mobile device (e.g. mobile device 130) upon selection of a project from the mobile device interface (e.g. interface 300). As in FIG. 2, a share user on a mobile device with the contribute attribute (i.e. enabled or set to true), may contribute video 430 (by pressing a video record button 434 and a video stop button 432), images 440 (by pressing image capture button 442), and/or audio 450 (by pressing audio record button 454 and audio stop button 452). Such video, images, and audio may be derived from devices associated with, or otherwise accessible by (whether locally or remotely) the mobile device (e.g. the smart phone camera on the device, video streamed over an internet connection, etc.). Though not illustrated in FIG. 4, in some examples, the share user may also contribute written media via a text input. In such examples, a similar timestamping technique as discussed with respect to FIG. 2 may be employed to provide character based timestamping for text provided from a mobile device. In some examples, the share user may also contribute other media, such as files, etc.

As in the example illustrated in FIG. 2, whenever a share user captures video, an image, or audio, the corresponding data may be transmitted to a cloud based server and associated with one or more timestamps. In some examples, the timestamp may be provided by the user's computing and/or mobile system. In order to account for differences in times between multiple devices, the computing device/system (e.g. computing system 110, computing system 120a-120n, and/or mobile devices 130a-130n) may first query the cloud based server (e.g. cloud based server 102) for a time. In some examples, the timestamp may be created by the cloud based server upon upload of the media. After uploading the media (e.g. video, audio, image, text, files, etc.) the cloud based server may store the media and associate the media with the timestamp and the project. Such an associated may be stored in a database, such as database 140. Associating timestamps with various media may be done by any method described herein.

Collaborative and Contextual Viewing Interface

Figure 5:
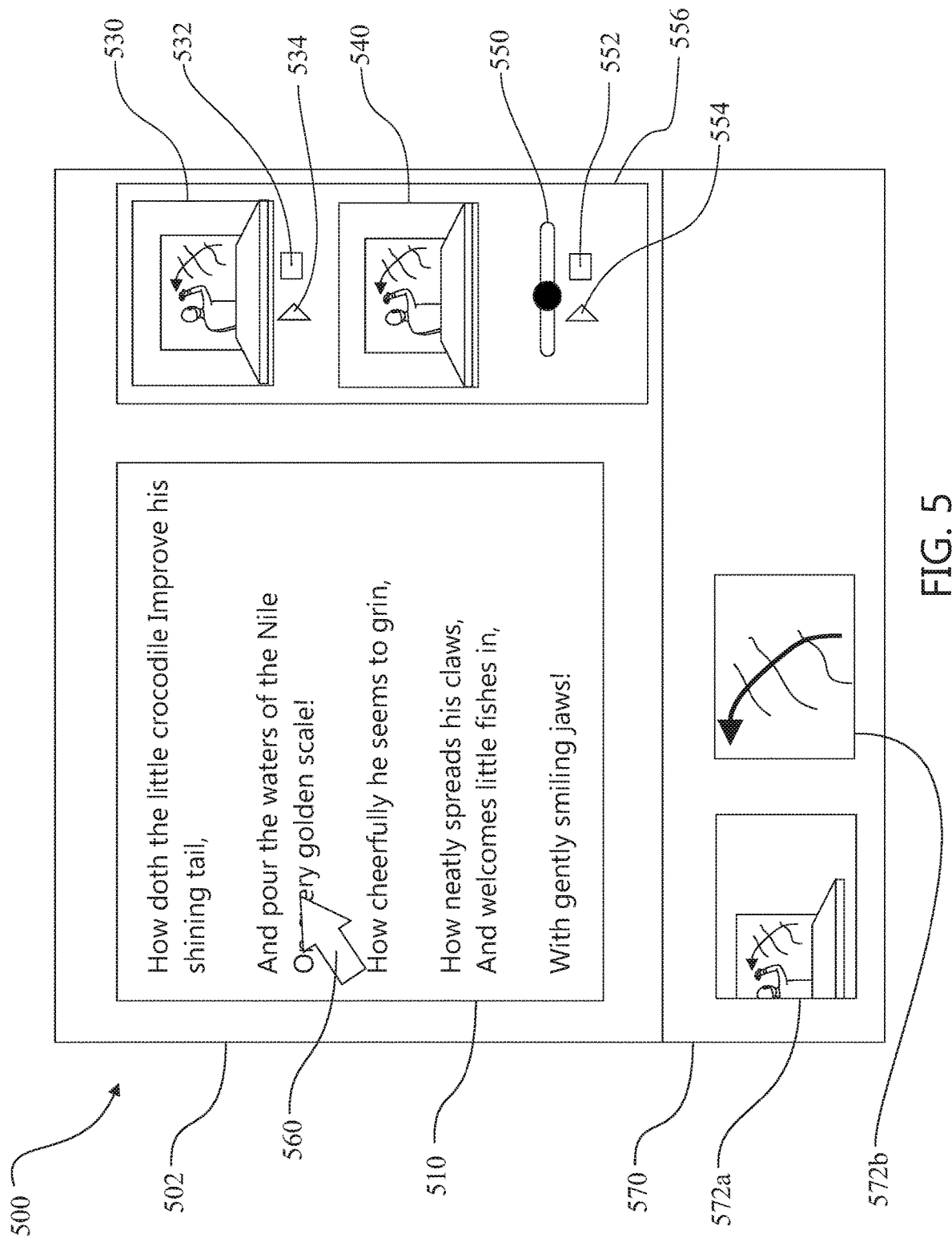
FIG. 5 depicts an example of a user interface for displaying collaborative and contextual media of a project.

FIG. 5 illustrates how a user may view a project in view interface 500. As illustrated, the project may be displayed in a window 502, with all associated media (whether in desktop or mobile). Text may be displayed in one or more panels, such as text panel 510. In a media panel 570 of interface 500, all media associated with the project may be displayed. As shown in FIG. 5, such media includes video 572a and image 572b.

Clicking, highlighting, or otherwise selecting, any of the media may cause the user's computing system (e.g. computing system 110) to query the cloud based server for all media having a timestamp similar to that of the selected media. In some examples, all media within some time frame may be selected (e.g. having a timestamp within 2-5 s on either side of the selected media). With respect to media, such time frames may be relative to the playback position (e.g., the offset from a start position) with respect to the media.

Upon clicking on a word, or highlighting a portion of the text panel 510 using a pointer 560, a query may be made to the cloud based server to return all media having a timestamp at or about the selected character(s). In those instances where multiple characters are highlighted, the cloud based server may return all media having a timestamp within at or about (e.g. within 1 s, 2 s, 5 s, etc.) the range of all times associated with characters selected.

As illustrated in FIG. 5, a user has selected the word "every" in text panel 510 using pointer 560. In response to the query sent to the cloud based server, a video 530 (having start button 534 and stop button 532), an image 540, and an audio output 550 (having a start button 554 and an audio stop button 552) are displayed in a related media panel 556 (e.g. a section, portion, or area of the application window 502). It should be noted that both the video 530 and audio 550 are positioned at an offset, such that media begins playing at or about (e.g. within 12, 2 s, 5 s, etc.) the timestamp of the selected media (and in the case of multiple timestamps associated with multiple highlighted characters, that of the earliest). As illustrated in FIG. 5, the media displayed in the related media panel 556 was created at (or, in some examples, about, e.g. within 5 s) of when the word "every" was written. In such a way, the user is provided context for the words that were written, i.e. by being reminded with the video 530, image 540, and audio sample 550. Furthermore, such media may be generated by other users in other locations, or having other devices. In such examples, the user viewing the project is able to gain much more context from the collaboration of multiple contributors, rendering the memory as if he had it from multiple locations simultaneously.

In some examples, if some non-text media have timestamps earlier than the earliest character in the text and the earliest character is selected, all the earlier media may be displayed as related media. Similarly, media having timestamps greater than the latest character of text may be displayed as related media when the selected portion of text includes the latest character.

While note shown in FIG. 5, selecting one or more characters, playback positions in media, etc. may also retrieve all text from all text based media and highlight those relevant portions (e.g., those portions having timestamps at or about (e.g., within 1 s, 2 s, 5 s, etc.) of the selected text).

Though not illustrated in FIG. 5, interface 500 may also provide the user an option to display text based media with visual timestamps. As a non-limiting examples, a color palette may be created having colors ranging from green to red, passing through white. Character times (i.e. timestamps) of characters (e.g. characters of text in text panel 510) may be mapped to the palette such that each character in the text panel 510 is highlighted with the color mapped to their time. In one example, a difference between a maximum time and a minimum time may be scaled from 0-255, where each integer from 0 to 255 is associated with an RGB value. In such an example, characters written during the beginning of typing may have a sharper green value which fades into a white background as time progresses. The highlighting may then darken to a red background as timestamps associated with the characters progress further and further in time. In such a respect, the user may be able to visually inspect when and where typing occurred. Further, any such mapping from colors to time may be used to indicate to a user viewing the media a context of when characters or words were typed.

The methods 600-700 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 600-700 can be combined in whole or in part with each other or with other methods.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Figure 6:
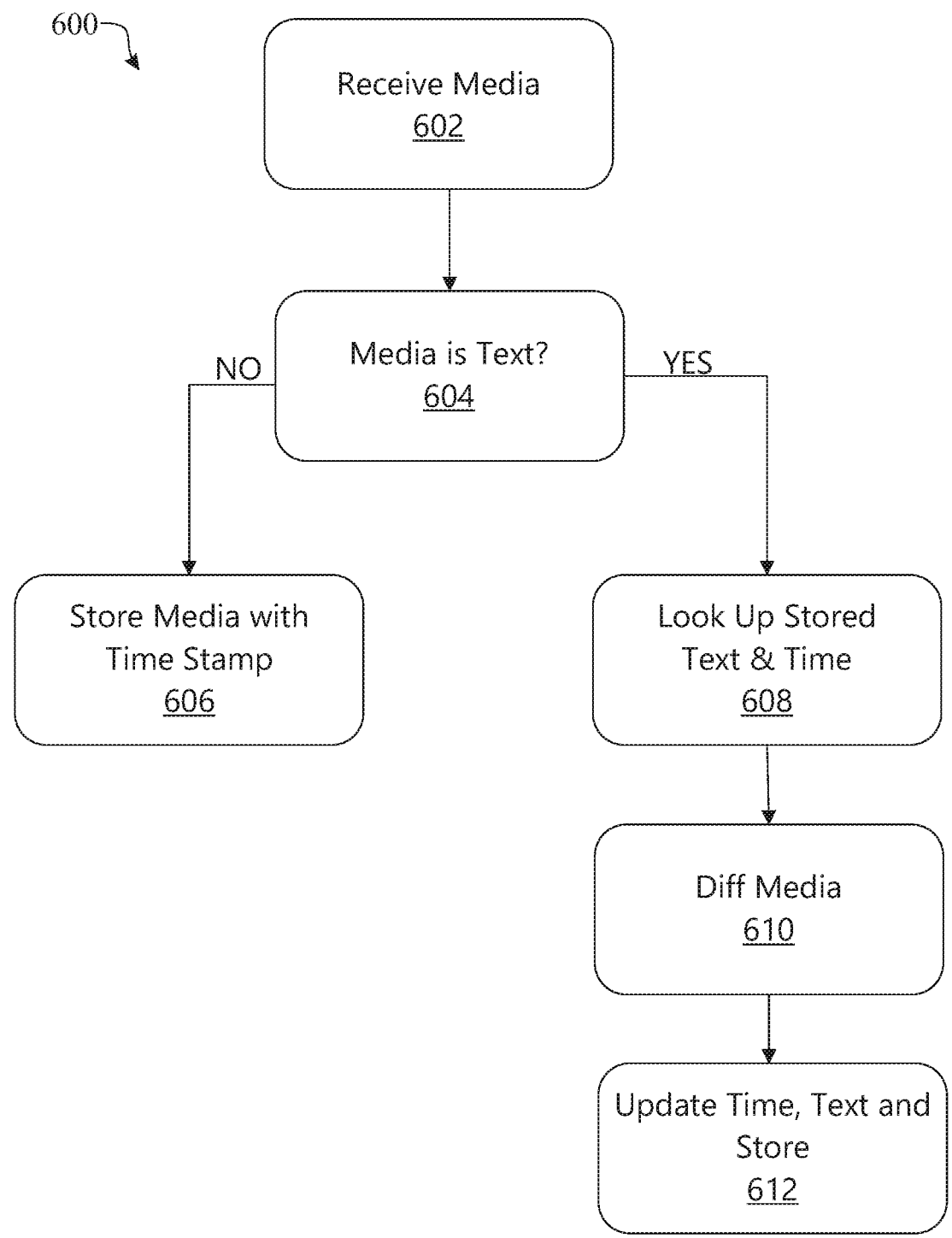
FIG. 6 depicts an example process for storing collaborative media.

FIG. 6 illustrates an example flow diagram 600 for associating timestamps with media on a cloud based server. At 602, media may be received by a cloud based server. As above, such media may be video, images, audio, files, or text.

At 604, the cloud based server may determine if the media is text or not. If the media is not text, the cloud based server may simply store the media (or a portion thereof, for example, upon streaming from a computer system) and associate a current timestamp with the media in a database accessible to the cloud based server.

If the media is text (including text having any markup or meta-data), flow continues to 608. At 608, the cloud based system performs a retrieval of previously stored text. The text may be stored in a single file or record from the database accessible to all users (including share users with contribute attributes), or may be a separate file or record per text contributed per user. Additionally, the system may retrieve a list of timestamps associated with each character. Such timestamps may be individually stored in the database, or stored as a comma separated list stored either on the system as a file or in the database. Sequential values in the comma separated list may indicate the timestamp associated with sequential characters in the text.

At 610, a difference operation is performed on the text and the previously stored text. The result of the difference operation is an array (or otherwise) of values which indicate whether the difference between the text is an insertion, a deletion, or that the characters are unchanged (i.e. the same).

At 612, a current timestamp value can be retrieved at the cloud based server. In those examples where the cloud based server is representative of multiple computing systems, a single computing system may operate as the official time server. Based on the difference operation, wherever an insertion is determined, a timestamp is inserted (or otherwise associated). Where a deletion is detected, the corresponding timestamp is deleted, or otherwise removed. Otherwise (i.e. the character is unchanged), the timestamp remains unchanged. Such a process yields an updated timestamp sequence. The updated timestamps are then stored as a comma separated list, either as a file accessible by the cloud based server or as a record in the database, or as individual records in the database. Additionally, the newly acquired text is stored, either as a file accessible by the cloud based server, or as a record in the database.

Figure 7:
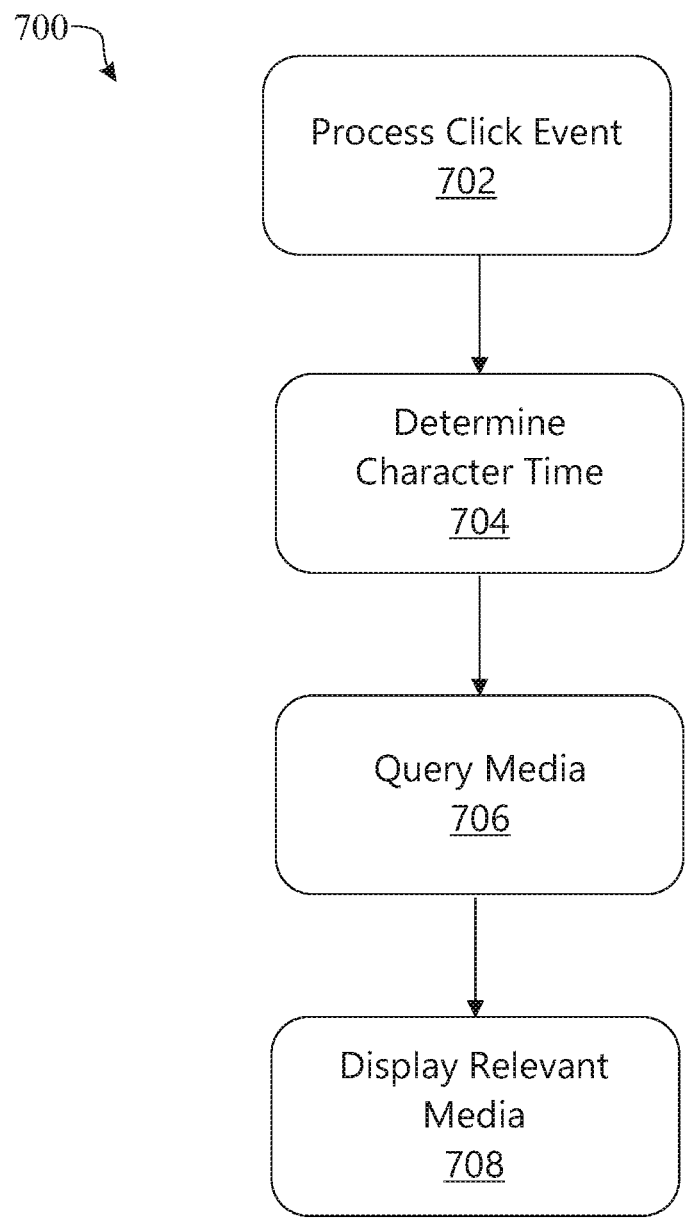
FIG. 7 depicts an example process for displaying collaborative media based on user input.

FIG. 7 depicts an example process 700 for retrieving relevant media. At 702, a user viewing a project may click, highlight, or otherwise select media (or portions thereof) associated with the project displayed to the user. An application may register the selection and transmit, to a cloud based server, the selected media (as non-limiting examples, as an id associated with the media, a filename of the media, a character start and/or stop position, a character start or stop timestamp, an offset or playback position, a string of timestamps (e.g. when such timestamps are available to the application on the viewing users computing system, etc.), or the selected media itself, etc.).

At 704, if the selection comprises a portion of highlighted text, the process 700 may comprise determining an earliest and latest timestamp. In some examples, timestamps associated with each character may reside in the application (e.g. as a JavaScript variable in those examples where the application is run inside of a web browser), such that highlighting a portion of text, the earliest and latest timestamps may be recovered. In some examples, relative character positions may be retrieved from the selected text (e.g. the first and last characters). Such character positions may be sent to the cloud based server. In such an example, the cloud based server may query the database for all timestamps associated with the characters between the first and last character selected. The earliest and latest timestamps correspond, in such an example, to the smallest and largest timestamps in the selected region.

At 706, the cloud based server may perform a query of the database for all media having timestamps at or about (e.g. within 1 s, 2 s, 5 s, etc.) of the selected media timestamp(s). In those examples where the selection comprises text, the query may be for all media between at or about (e.g. within 1 s, 2 s, 5 s, etc.) the earliest timestamp and latest timestamp associated with the characters in the selection. In querying for media having a duration (e.g. video and audio recordings, etc.), the query may not be the timestamp of the media itself, but rather if the timestamp(s) of the selection would occur within the timespan of the timestamp of the media plus the duration of the media. Returning such media (e.g. audio, video, etc.), the return value may comprise the media, as well as an offset such that the timestamp of the media plus the offset time is at or about (e.g. within 1 s, 2 s, 5 s) of the selection timestamp(s).

At 708, the process 700 may cause the application to display the media returned from the query, such that displayed media is related to the selected media (i.e. related media). In those instances where the media also contains an offset, such media may be positioned such that the media begins playing at the offset (e.g. for audio, video, etc.).

The Computerized System

Figure 8:
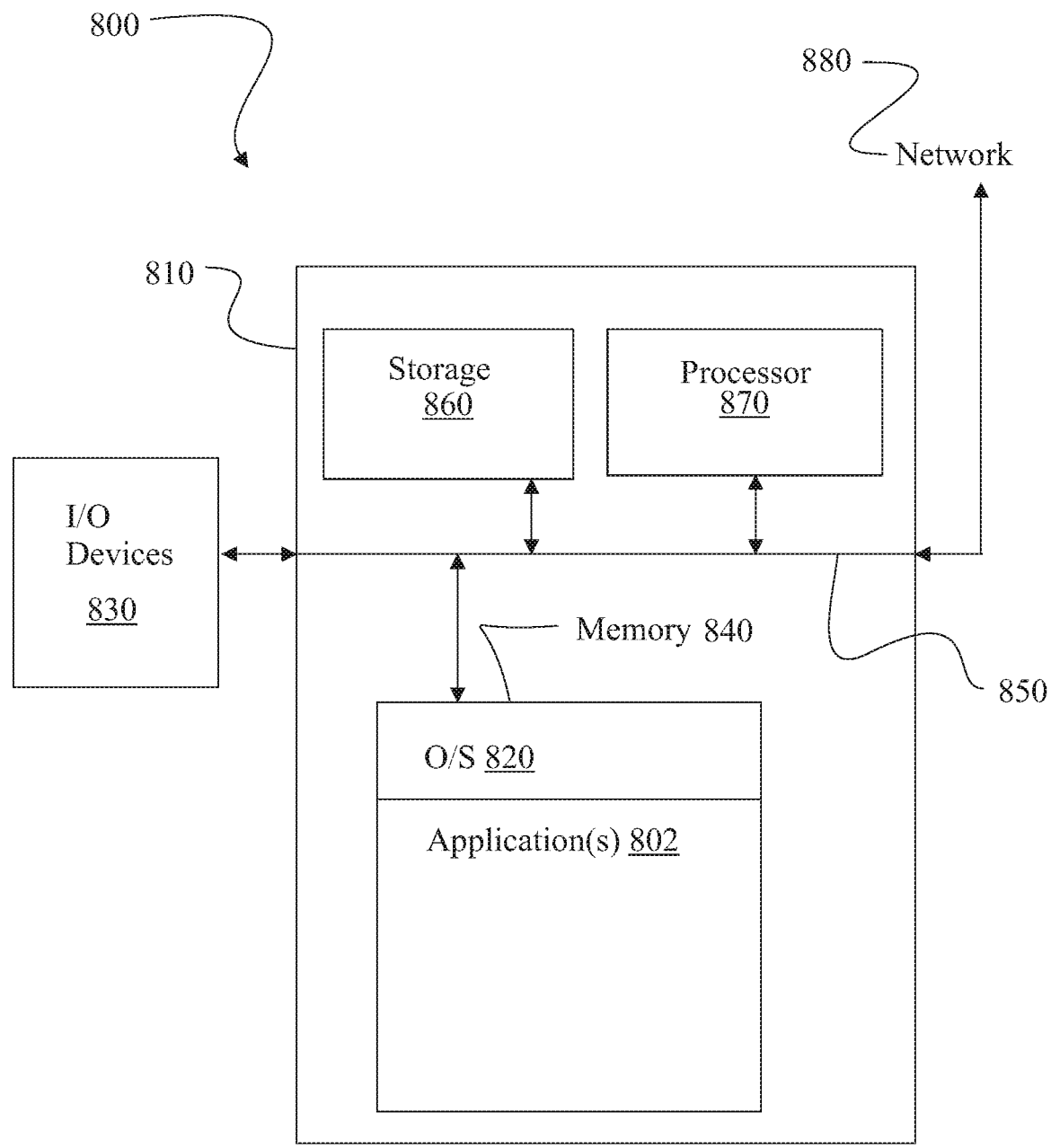
FIG. 8 depicts an example computer system capable of performing any or all of the processes of the system described herein.

Turning briefly to FIG. 8, a computerized system 800 is depicted as an example computerized system on which the invention may be implemented. The computerized system 800 depicts a computer system 810 that comprises a storage 860, a processor 870, a memory 840, and an operating system 820. The storage 860, processor 870, memory 840, and operating system 820 may be communicatively coupled over a communication infrastructure 850. Optionally, the computer system 810 may interact with a user via I/O devices 830, as well as a network 880, via the communication infrastructure 850. The operating system 820 may interact with other components to control application 802.

The systems and methods described herein can be implemented in software or hardware or any combination thereof.

The systems and methods described herein can be implemented using one or more computing devices/systems which may or may not be physically or logically separate from each other. The methods may be performed by components arranged as either on-premise hardware, on-premise virtual systems, or hosted-private instances. Additionally, various aspects of the methods described herein may be combined or merged into other functions.

An example computerized system for implementing the invention is illustrated in FIG. 8. A processor or computer system can be configured to particularly perform some or all of the method described herein. In some embodiments, the method can be partially or fully automated by one or more computers or processors. The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the invention may be directed toward one or more computer systems capable of carrying out the functionality described herein. Example computing devices may be, but are not limited to, a personal computer (PC) system running any operating system such as, but not limited to, Microsoft™ Windows™. However, the invention may not be limited to these platforms. Instead, the invention may be implemented on any appropriate computer system running any appropriate operating system. Other components of the invention, such as, but not limited to, a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as but not limited to, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

The techniques presented herein improve the performance of a computer. In particular, the techniques enable multiple users to have context for associated media recordings, where not previously enabled. By storing and manipulating media entered in such a manner, user recollection is optimized, rendering improved user experience, performance, and the like. Such capabilities are not available in existing applications. As such, the systems and techniques presented herein provide technical solutions to the problem of creating user recollection and providing user context with respect to multiple forms of media, not previously enabled or otherwise available, thereby improving the performance of a computer/computing system.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A method comprising:
    receiving, from a user at a first device, a request to create a new project;
    sending the request to a server, the request configured to cause the server to create a database entry of the new project and associate the user with the project, wherein associating the user with the project comprises associating a contribute attribute and view attribute with the user and the project;

determining, as new text, all text in a text area entered by the user at a current time, the text area associated with previously entered text in the text area at a previous time;

comparing the new text with the previously entered text to determine a difference between the new text and the previously entered text;

sending, based at least in part on determining the difference, at least a portion of the new text to the server, the server configured to associate a plurality of first current timestamps of the server with each character of the at least a portion of the new text;

receiving media from the user, the media created substantially simultaneously with the new text and comprising one or more of a video recording, an image, an audio recording, or a file;

sending the media to the server, the server further configured to associate a second current time stamp of the server with the media and to associate the media with the project;

displaying a final text to the user;

receiving an indication from the user to retrieve at least a portion of related media from the server, the indication comprising one or more of:
  highlighting a portion of the final text,
  clicking on an image displayed to the user,
  clicking on a video displayed to the user, or
  clicking on an audio recording displayed to the user;

sending the indication to the server;

receiving, from the server and based at least in part on a range of times associated with the indication, a plurality of related media, each of the plurality of related media having timestamps within a threshold amount of time of the range of times associated with the indication; and displaying the plurality of related media to the user.

2. The method of claim 1, wherein the user is a first user, the method further comprising:
  receiving, from the first user, a first add user request to add a first additional user, the first additional user having both a contribute attribute and a view attribute;
  sending, to the server, the first add user request, the first add user request configured to cause the server to associate the first additional user with the project with a contribute attribute and view attribute;
  receiving, from the first user, a second add user request to add a second additional user, the second additional user having only a view attribute; and
  sending, to the server, the second add user request, the second add user request configured to cause the server to associate the second additional user with the project with only a view attribute.

3. The method of claim 2,
  wherein at least a portion of the related media displayed to the first user was generated by the first additional user at a second device, the at least a portion of the related media associated with additional timestamps determined by the server, and
  wherein the at least a portion of related media comprises text entered by the first additional user at the second device and one or more of audio generated by the first additional user at the second device or video generated by the first additional user at the second device.

4. The method of claim 3, wherein sending the at least a portion of the new text is further based at least in part on determining that an amount of time between a current time of the first device and a previous sending of text to the server meets or exceeds a threshold difference in time.

5. The method of claim 1, wherein associating the first current timestamp of the server with the at least a portion of the new text comprises one or more of:
  inserting an association of the first current timestamp of the server with one or more characters of the new text; or
  removing an association of a previous current timestamp of the server with one or more characters of the previously entered text.

6. The method of claim 1,
  wherein the associated timestamp of the indication is one or more of:
    a character timestamp associated with a character clicked on in the final text,
    a minimum character timestamp of a plurality of characters highlighted,
    a maximum character timestamp of the plurality of characters highlighted, or
    a sum of a video playback offset time of a selected video recording and a timestamp associated with of the selected video recording, or
    a sum of an audio playback offset time of a selected audio recording and a timestamp associated with of the selected audio recording; and
  wherein displaying the related media comprises one or more of:
    highlighting related characters of all text having timestamps within a threshold amount of time of the associated timestamp of the indication,
    displaying a related image having an image timestamp within a threshold amount of time of the associated timestamp of the indication,
    displaying a related video starting at a related video playback offset, wherein the related video playback offset is selected such that a sum of the timestamp associated with the related video and the related video playback offset is within a threshold time of the timestamp associated with the indication, or
    displaying a related audio recording starting at a related audio playback offset, wherein the related audio playback offset is selected such that a sum of the timestamp associated with the related audio recording and the related audio playback offset is within a threshold time of the timestamp associated with the indication.

7. One or more non-transitory computer readable media having one or more instructions which, when executed by one or more processors cause the one or more processors to:
  receive, from a user at a first device, a request to create a new project;
  send the request to a server, the request configured to cause the server to create a database entry of the new project and associate the user with the project;
  receive, as new text, all text entered by the user in a text area associated with a current time, the text area associated with previously entered text in the text area at a previous time;
  compare the new text with the previously entered text to determine a difference between the new text and the previously entered text;
  send, based at least in part on determining the difference, at least a portion of the new text to the server, the server configured to associate a plurality of first current timestamps of the server with each character of the at least a portion of the new text;

receive media from the user, the media created substantially simultaneously with the new text and comprising one or more of a video recording, an image, an audio recording, or a file;

send the media to the server, the server further configured to associate a second current time stamp of the server with the media and to associate the media with the project;

display final text to the user;

receive an indication from the user to retrieve at least a portion of related media from the server;

send the indication to the server;

receive, from the server and based at least in part on a range of times associated with the indication, a plurality of related media, the plurality of related media having timestamps within a threshold amount of time of the associated timestamp of the indication; and display the plurality of related media to the user.

8. The one or more non-transitory computer readable media of claim 7, wherein the indication comprises one or more of:

highlighting a portion of the final text,
clicking on a character of the final text,
clicking on an image displayed to the user,
clicking on a video displayed to the user, or
clicking on an audio recording displayed to the user, and
wherein the final text comprises all text in the text area when the project was closed.

9. The one or more non-transitory computer readable media of claim 8, wherein the associated timestamp of the indication is one or more of:

a character timestamp associated with a character clicked on in the final text,
a minimum character timestamp of a plurality of characters highlighted in any text displayed to the user,
a maximum character timestamp of the plurality of characters highlighted in any text displayed to the user, or
a sum of a video playback offset time of a selected video recording and a timestamp associated with of the selected video recording, or
a sum of an audio playback offset time of a selected audio recording and a timestamp associated with of the selected audio recording; and
wherein displaying the related media comprises one or more of:
highlighting related characters of all text having timestamps within a threshold amount of time of the associated timestamp of the indication,
displaying a related image having an image timestamp within a threshold amount of time of the associated timestamp of the indication,
displaying a related video starting at a related video playback offset, wherein the related video playback offset is selected such that a sum of the timestamp associated with the related video and the related video playback offset is within a threshold time of the timestamp associated with the indication, or
displaying a related audio recording starting at a related audio playback offset, wherein the related audio playback offset is selected such that a sum of the timestamp associated with the related audio recording and the related audio playback offset is within a threshold time of the timestamp associated with the indication.

10. The one or more non-transitory computer readable media of claim 7, wherein associating the first current timestamp of the server with the at least a portion of the new text comprises one or more of:

inserting an association of the first current timestamp of the server with one or more characters of the new text; or removing an association of a previous current timestamp of the server with one or more characters of the previously entered text.

11. The one or more non-transitory computer readable media of claim 10, wherein inserting an association comprises inserting one or more of the first current timestamp or the one or more characters into a comma separated value file.

12. The one or more non-transitory computer readable media of claim 7, wherein at least a portion of the related media displayed to the user was generated by a first additional user at a second device, the at least a portion of the related media associated with additional timestamps determined by the server, and wherein the at least a portion of related media comprises text entered by the first additional user at the second device and one or more of audio generated by the first additional user at the second device, video generated by the first additional user at the second device, or images generated by the first additional user at the second device.

13. A system having one or more processors and one or more memories, the memories comprising instructions which, when executed by the one or more processors, cause the one or more processors to:

receive, from a user at a first device, a request to create a new project;

send the request to a server, the request configured to cause the server to create a database entry of the new project and associate the user with the project;

receive, as new text and at a current time, text in a text area entered by the user, the text area associated with previously entered text in the text area at a previous time;

compare the new text with the previously entered text to determine a difference between the new text and the previously entered text;

send, based at least in part on determining the difference, at least a portion of the new text to the server, the server configured to associate a plurality of first current timestamps of the server with each character of the at least a portion of the new text;

receive media from the user, the media created substantially simultaneously with the new text and comprising one or more of a video recording, an image, an audio recording, or a file;

send the media to the server, the server further configured to associate a second current time stamp of the server with the media and to associate the media with the project;

receive an indication from the user to retrieve at least a portion of related media from the server;

send the indication to the server;

receive, from the server and based at least in part on a range of times associated with the indication, a plurality of related media, the plurality of related media having timestamps within a threshold amount of time of the range of times of the indication; and display the plurality of related media to the user, wherein at least a portion of the plurality of related media was generated by a first additional user at a second device, the at least a portion of the related media associated with additional timestamps determined by the server.

14. The system of claim 13, wherein the instructions, when executed, further cause the one or more processors to:
receive, from the first user, a first add user request to add the first additional user to the project, the first additional user having both a contribute attribute and a view attribute;
send, to the server, the first add user request, the first add user request configured to cause the server to associate the first additional user with the project with a contribute attribute and view attribute;
receive, from the first user, a second add user request to add a second additional user, the second additional user having only a view attribute; and
send, to the server, the second add user request, the second add user request configured to cause the server to associate the second additional user with the project with only a view attribute.

15. The system of claim 13, wherein sending the at least a portion of the new text is further based at least in part on determining that an amount of time between a current time of the first device and a previous sending of text to the server meets or exceeds a threshold difference in time.

16. The system of claim 13, wherein the associated timestamp of the indication is one or more of:
a character timestamp associated with a character clicked on in the any text displayed to the user,
a minimum character timestamp of a plurality of characters highlighted by the user in any text displayed to the user,
a maximum character timestamp of the plurality of characters highlighted by the user in any text displayed to the user,
a sum of a video playback offset time of a selected video recording and a timestamp associated with of the selected video recording, or
a sum of an audio playback offset time of a selected audio recording and a timestamp associated with of the selected audio recording; and
wherein displaying the related media comprises one or more of:
highlighting related characters of all text having timestamps within a threshold amount of time of the associated timestamp of the indication,
displaying a related image having an image timestamp within a threshold amount of time of the associated timestamp of the indication,
displaying a related video starting at a related video playback offset, wherein the related video playback offset is selected such that a sum of the timestamp associated with the related video and the related video playback offset is within a threshold time of the timestamp associated with the indication, or
displaying a related audio recording starting at a related audio playback offset, wherein the related audio playback offset is selected such that a sum of the timestamp associated with the related audio recording and the related audio playback offset is within a threshold time of the timestamp associated with the indication.

17. The system of claim 13, wherein the at least a portion of the related media is associated with additional timestamps determined by the server.

* * * * *